Figure 1:
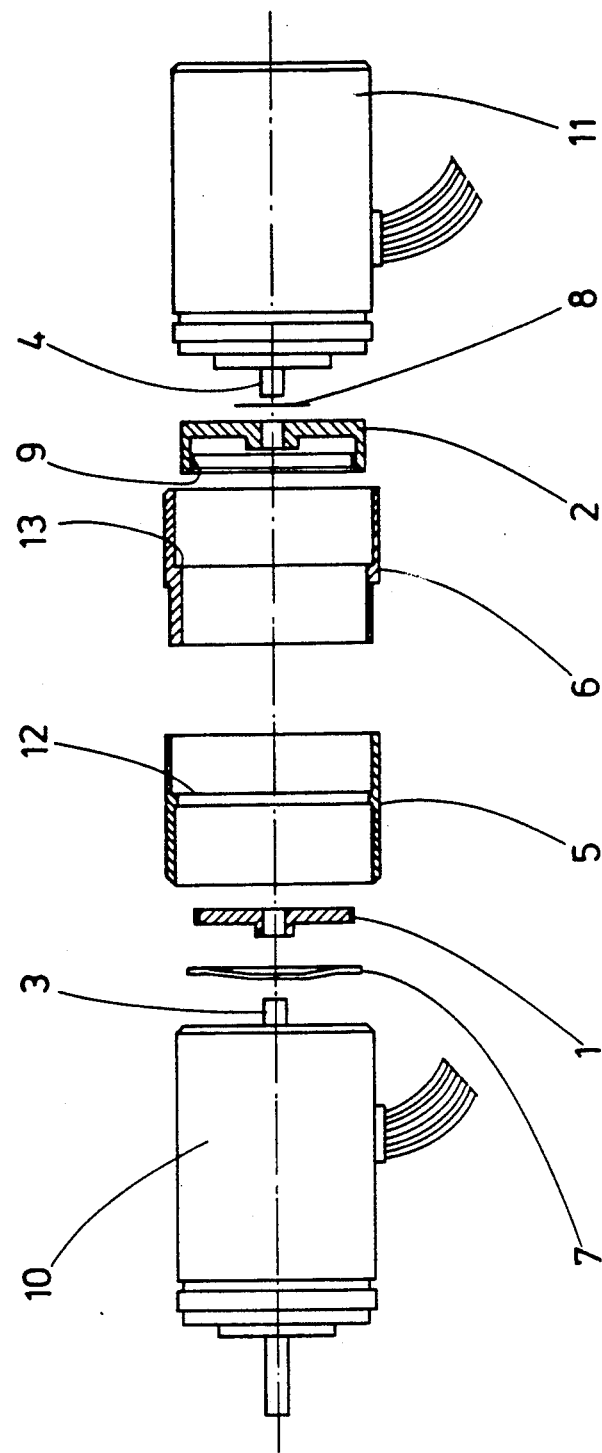

United States Patent [19]

Rennerfelt

[11] Patent Number: 5,025,563
[45] Date of Patent: Jun. 25, 1991

[54] MULTITURN ABSOLUTE ENCODER

[76] Inventor: Gustav Rennerfelt, Nilstorpsvägen 53, Lidingö, Sweden, S-181 47

[21] Appl. No.: 411,514
[22] PCT Filed: Mar. 28, 1988
[86] PCT No.: PCT/SE88/00153
§ 371 Date: Sep. 29, 1989
§ 102(e) Date: Sep. 29, 1989
[87] PCT Pub. No.: WO88/07655
PCT Pub. Date: Oct. 6, 1988

[30] Foreign Application Priority Data
Apr. 1, 1987 [SE] Sweden ............................ 8701362

[51] Int. Cl.$^5$ ................................. G01B 7/30
[52] U.S. Cl. .................... 33/1 N; 33/1 PT; 901/25
[58] Field of Search .............. 33/1 N, 1 PT; 901/9, 901/25

[56] References Cited
U.S. PATENT DOCUMENTS

| | | | |
|---|---|---|---|
| 3,634,946 | 1/1972 | Star | 33/1 PT |
| 3,793,731 | 2/1974 | Hyyppa et al. | 33/1 PT |
| 4,123,653 | 10/1978 | Bovie | |
| 4,660,288 | 4/1987 | Dangschat | 33/1 N |
| 4,771,545 | 9/1988 | Hisayasu et al. | 33/1 PT |

FOREIGN PATENT DOCUMENTS

| | | | |
|---|---|---|---|
| 0076901 | 4/1986 | Japan | 33/1 N |
| 84000280 | 10/1984 | Sweden | |
| 87002911 | 1/1987 | Sweden | |

Primary Examiner—Thomas B. Will
Attorney, Agent, or Firm—Witherspoon & Hargest

[57] ABSTRACT

Angle transducer unit of the multiturn measuring type for absolute measurement of the angular position of a rotatable shaft. A first transducer (10) of the absolute angular measurement type with a drive shaft (3) is non-rotatably mounted on the rotatable shaft. A second angle transducer (11) of the absolute angular measurement type has a driven shaft (4). There are gear wheels (1,2) mounted on the drive and driven shafts, these gear wheels being mutually in mesh to form a gear for up or down gearing of the rotational rate of the drive shaft. The two angle transducers, e.g. resolvers, are intended for being conventionally connected to an apparatus for measuring the differential angular position of the shafts. Novel to the angle transducer unit is that the gear wheels include an internally toothed gear wheel (2) and an externally toothed gear wheel (1). The latter rolls on the internally toothed gear wheel (2) and has a number of teeth which is only some few teeth, preferably only one tooth less than the number of teeth of the internally toothed gear wheel, and is mounted on one of the shafts 3 and 4. The internally toothed gear wheel (2) is mounted on the other shaft. Cylindrical housing parts are disposed for mounting the shafts mutually eccentric.

20 Claims, 5 Drawing Sheets

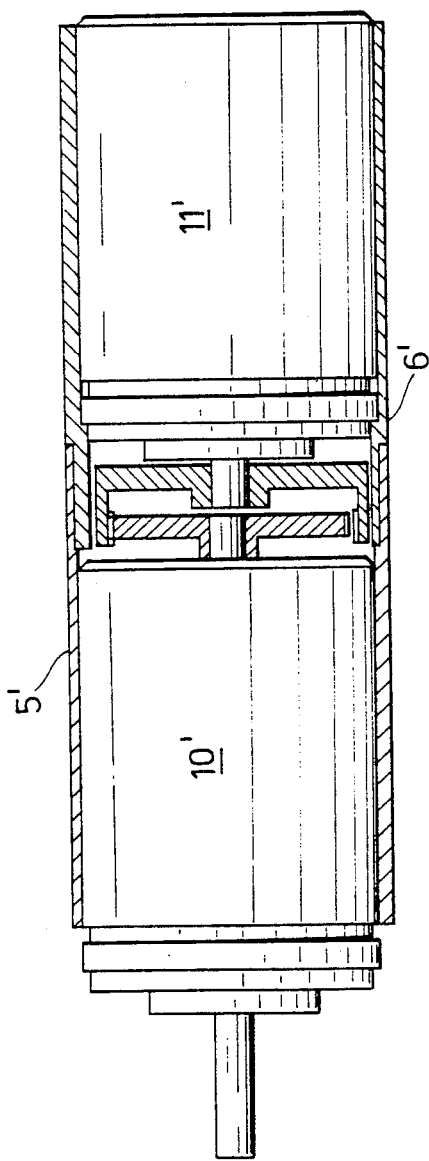
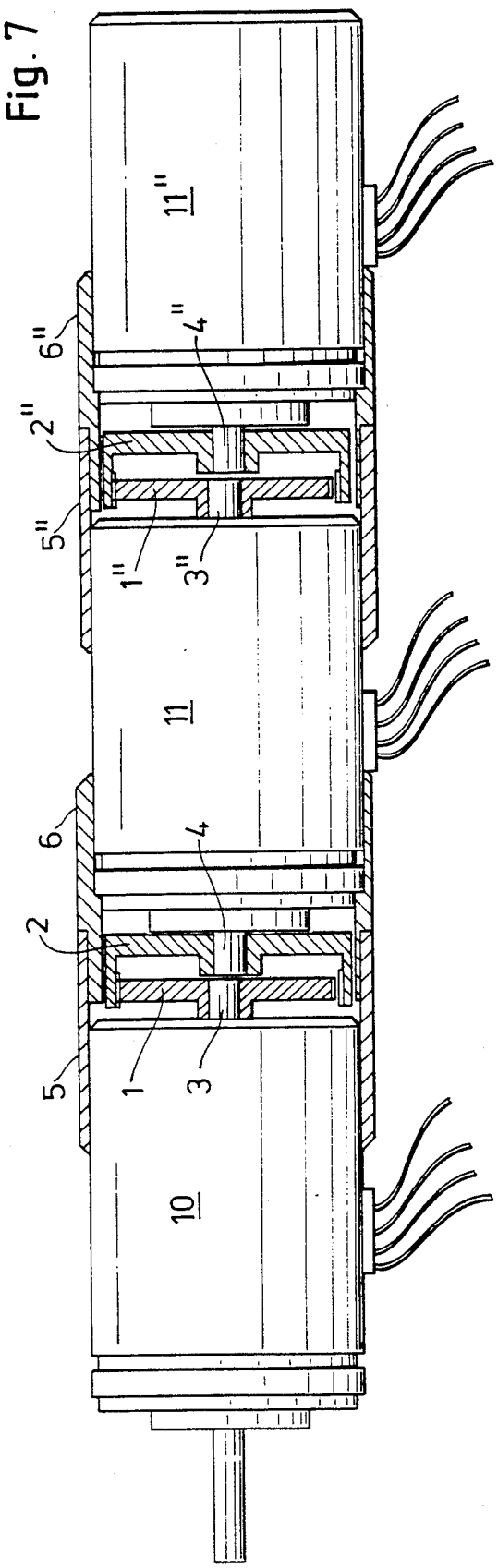

MULTITURN ABSOLUTE ENCODER

The present invention relates to angle transducers of the multiturn type, where the absolute angular position of a shaft which can rotate is measured, i.e. the total number of revolutions plus an angle less than 360° is measured from a fixed initial, reference position of the shaft.

For reasons of safety, angle transducers of the kind mentioned above are coming into greater and greater use with industrial robots. The reasons for this is that should a current failure occur it is essential to keep track of the absolute angular positions of the respective rotating shafts in the robot, because when power returns the robot must continue its motion from where it left off when current failed. In other words, a current failure must not mean that the respective angle transducers record zero values, since this would mean that when current returns the respective shafts in it would start from their respective zero angular positions, which could give the robot a completely incorrect motion and could mean danger to life for persons in the vicinity of the robot. Such undesired zero setting of angular position occurs if the respective angle transducer does not measure the shaft angle absolutely but only relative to the angle at which the shaft happens to stop.

Angle transducers of the kind mentioned are known, and usually comprise two transducers, e.g. resolvers or electro-optical transducers arranged side by side, and mutually connected via a spur gear. One of the transducers is connected to a rotating shaft of the robot. The gear comprises two gear wheels, one of which has 64 teeth, for example, and the other 65 teeth. The differential rotation of the resolvers enables absolute measurement of the total angle passed through by the rotating shaft. Any angular position of the two resolvers corresponds to an unambiguously determined total turning angle of the rotating shaft. The differential turning angle is determined by conventional electrical circuits, which may be of the phase-sensitive type or the amplitude sensitive type.

The angle transducer unit described in the last paragraph has plurality of disadvantages. The transducers in it are situated side by side and are mutually connected to the gear, resulting in that the cylindrical housing into which the whole transducer unit is usually built has a large diameter. In certain applications, the space taken up by the transducer housing on the machine detail where the rotating shaft is situated is disadvantageously large. The gear, which solely comprises two externally toothed spur gears in mesh, is not free from backlash. To prevent this backlash, one of the gear wheels is provided with a springbiased gear wheel which urges the gear wheels in the gear into mesh with each other during all rotational phases of the shaft. The teeth of the gear are subjected to large loads due to the large moment of inertia of the driven gear wheel and the high momentary accelerations occuring for rapid positional changes, or when the rotating shaft changes its direction of rotation. Such large accelerations cause wear on the teeth after a while. Only one tooth on one gear wheel is simultaneously in engagement with a tooth on the other gear wheel of the gear, resulting in that only these two teeth take up the acceleration stresses. This causes wear on the teeth of the gear. The meshing factor of a conventional spur gear is normally about 1.6–2. Both gear wheels in a conventional spur gear rotate at high absolute speed and the mutual, relative tooth speed is very high. The high relative tooth speed causes wear on the teeth. All this reduces the life of the known angle transducer. Due to the high tooth speeds and thereby the high centrifugal force, the gear lubricant will be urged away from the teeth. To obtain good, durable lubrication it is necessary for the gear wheels to be disposed in an oil bath.

The present invention has the object of providing an angle transducer of the kind mentioned in the introduction, which, while avoiding the above mentioned disadvantages has long life, and for this purpose has a gear with small moment of inertia, low relative tooth speed and a high meshing factor as well as the least possible backlash without using spring biased bear wheels.

The characterizing features of the invention are disclosed in the accompanying claims.

From a study of the claims it will be understood that since the externally toothed gear wheel only has few teeth, preferably only one tooth, less than the internally toothed gear wheel there is obtained:

a) in the case where the internally toothed gear wheel is mounted on the shaft of the driving transducer and the externally toothed gear wheel on the shaft of the driven transducer that when the driving shaft has rotated one revolution, the driven shaft has rotated one revolution plus the angle taken up by the difference in the number of teeth, a small upward gearing thus being obtained, b) in the case where the externally toothed gear wheel is mounted on the driving shaft and the internally toothed gear wheel on the driven shaft, that when the rotating shaft has rotated one revolution the driven shaft has rotated one revolution minus the angle occupied by the difference in the number of teeth.

If the driving rotational rate is high, both gear wheels do indeed rotate at high rotational rates, but the relative tooth speed of the gear wheels is very low, more specifically the rotational rate of the driving shaft divided by the number of teeth on the gear wheel mounted on the driving shaft. Due to this low relative tooth spaced, the wear on the teeth is reduced considerably, compared with the gear conventionally used.

As the externally toothed gear rolls against the internally toothed gear, there are a plurality of teeth in mesh simultaneously, i.e. the gear has a greater meshing factor, which is about 8. In the inventive gear a large number of teeth will thus take up the acceleration stresses in the meshing teeth. By distributing the load caused by the acceleration over so many teeth, the life of the teeth, and thereby that of the gear is increased.

By turning the houses relative each other, the backlash can be brought to a least possible value, which is advantageous from the manufacturing aspect, since the teeth do not need to be mashined with particularly tight tolerances. The situation is actually the reverse, i.e. rather large tolerances can be permitted and these can be compensated by turning the houses relative each other so that the externally toothed gear wheel comes into a desired degree of engagement with the internally toothed gear wheel. There is thus avoided the use of separate, spring biased gear wheels.

Due to the end-on-end mounting of the angle transducers, the amount of space taken up by the transducer units on the machine detail where the output shaft is situated is reduced. In other words, the inventive apparatus requires extension in length rather that in width.

Figure 3:
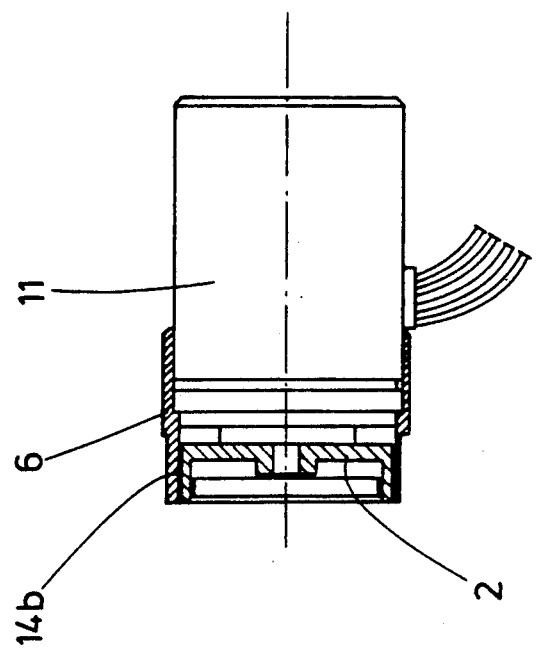
Figure 2:
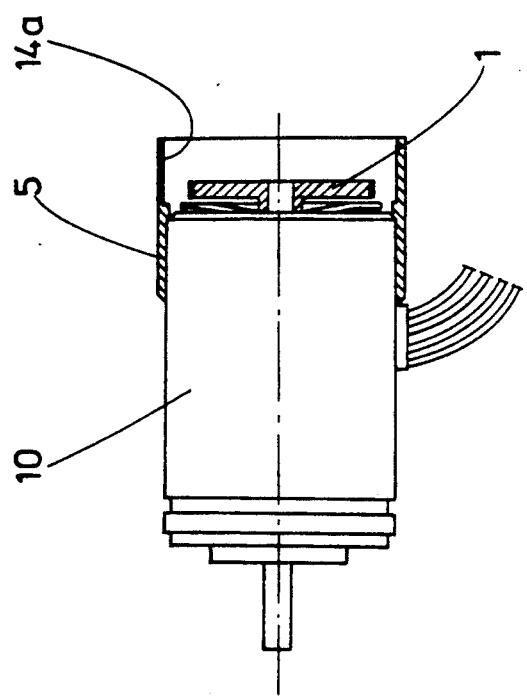
Figure 4:
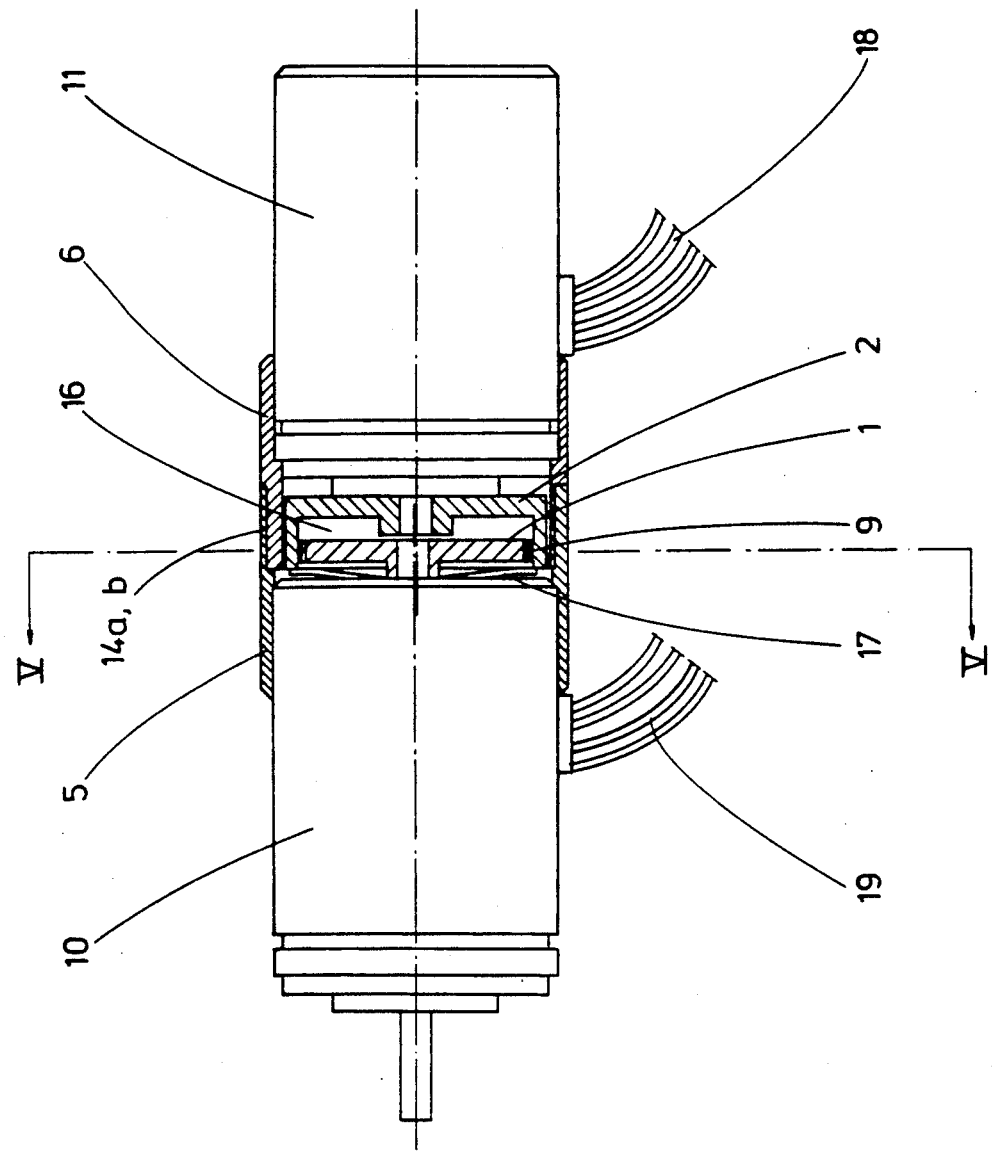
Figure 5:
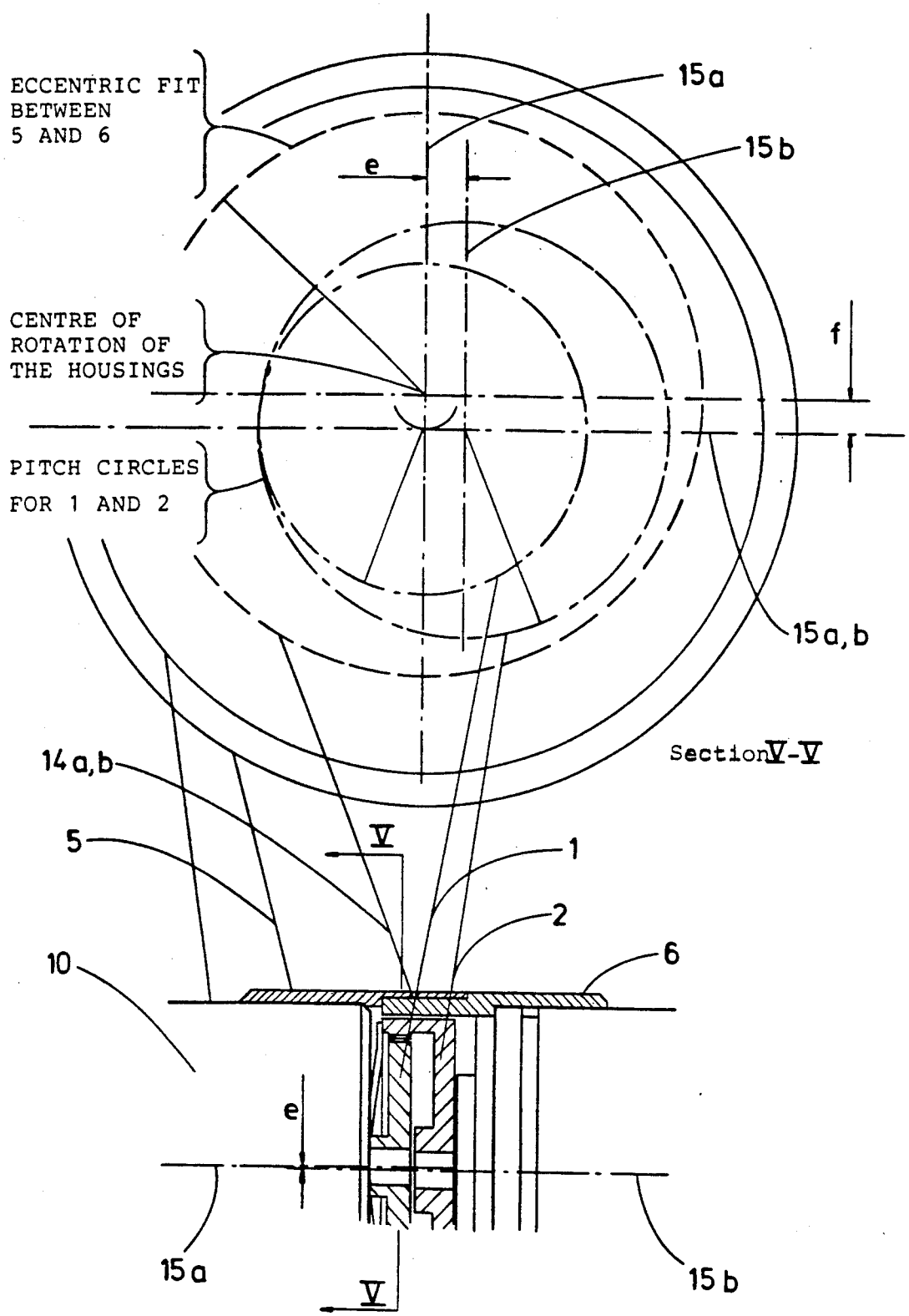

The invention will now be described in more detail hereinafter in connection with the accompanying drawings, where FIG. 1 is an exploded view showing the apparatus in accordance with the invention, FIG. 2 is a section of one angle transducer mounted in its housing, FIG. 3 is a section of the other transducer mounted in its housing, FIG. 4 is a section showing the transducers according to FIG. 2 and 3 fitted together into a unit, FIG. 5 is a section along the line V—V in FIG. 4, the eccentricities being heavily exaggerated, FIG. 6 is a view showing the transducers fitted together in an alternative embodiment, and FIG. 7 is a view showing the transducers fitted together in yet another alternate embodiment.

It will be seen from FIG. 1 that the apparatus in accordance with the present invention includes an externally toothed gear wheel 1, an internally toothed gear wheel 2, a drive shaft 3, a driven shaft 4, a first housing 5, a second housing 6 and two cover plates 7 and 8.

The externally toothed gear wheel 1 has 63 teeth and the internally toothed gear wheel 2 has 64 teeth 9 against which the externally toothed gear wheel 1 is to mesh.

The gear wheels are fabricated in the manner described in my Swedish patent application 87 00291-1. The units 1-6 form a gear of a nature such that when the gear drive shaft 3 has rotated 64 revolutions its driven shaft 4 has rotated 63 revolutions. The drive shaft 3 of the gear is a part of an angle transducer 10 of conventional kind, e.g. a resolver with a cylindrical housing. The shaft 3 is preferably straight through and the part of its projecting out to the left from the housing in FIG. 1 is intended to be non-rotatably connected to the unillustrated rotating shaft which is to have its absolute angular position determined. In the same way, the driven shaft 4 of the gear is a shaft in an angle transducer 11, e.g. a resolver. This transducer 11 also has a cylindrical housing and is intended for fitting into the other housing 6.

Booth housings 5 and 6 are in the form of cylindrical sleeves. In the first cylindrical housing 5 there is a cylindrical shoulder 12, defining the depth to which the first transducer 10 can be thrust into the first housing 5. In the second housing 6, there is correspondingly a cylindrical shoulder 13 defining the depth to which the cylindrical transducer 11 can be thrust. Both transducers are fixed non-rotatably in the respective housing 5, 6 e.g. by glue or cement. FIG. 2 illustrates the step in assembly where the transducer 10 is fitted into the housing 5, the cover plate 7 placed over the drive shaft of the gear, subsequent to which the externally toothed gear wheel is non-rotatably attached, e.g. by glue, on the shaft 3. FIG. 3 illustrates how the transducer 11 is fitted into the other housing 6, after which the cover plate 10 is placed over the driven shaft 4 of the gear and finally the internally toothed gear wheel 2 is fixed, e.g. by glue, on the shaft 4. The cover plates 7 and 8 serve as barriers to the penetration of glue along the respective shafts 3, 4. The gear is lubricated.

The shafts 3 and 4 are parallel with their centre lines 15a and 15b at mutual spacing e, see FIG. 5. This spacing e enables the externally toothed gear wheel 1 to roll round the internally toothed gear wheel 2, and can thus be regarded as the measure of an eccentric mounting of the driven shaft 3, where e is the difference between the pitch radii of the gear wheels. As will be seen from FIG. 2, there is a cylindrical bore 14a in the housing 5. As will be seen from FIG. 5, this bore 14a is eccentric relative the longitudinal symmetry axis 15a of the housing. The eccentricity is denoted by f. As will be seen form FIG. 3, there is a cylindrically machined surface 14b on one end portion of the housing 6. This surface 14b is similarly arranged eccentrically relative the longitudinal symmetry axis 15b of this housing 6, as will be seen from FIG. 5. The eccentricity is the vectorial sum (magnitude and direction) of e and f relative the longitudinal symmetry axis 15b.

The surface 14b is intended to be a light drive fit in the bore 14a, as will be seen from FIG. 4, which illustrates the two transducer parts 10 (FIG. 2 and 11) in FIG. 3 assembled together such that the gear wheels are in mesh and a closed space 16 has been formed, which is axially defined partly by the cover plate 7 and partly by the gear wheel 2. The cover plate 7 thus prevents departure of the lubricant from the space 16 and thus has the double function of preventing penetration of glue and departure of lubricant from the space 16 as a result of the action of centrifugal force. In turn, this considerably extends the time intervals at which the transducer must be lubricated. The cover plate 7 should have a radial extension such that it covers the end wall 17 of the internally toothed gear wheel 2. Due to the low relative rotational rate of the two gear wheels 1 and 2, the cover plate 7 is only subjected to minimum wear.

By turning the housing 5 and 6 relative to each other, the gear wheels are displaced in mutual relationship, due to the eccentrically arranged fit 14a, 14b, and in this way the backlash between the two gear wheels is reduced to a minimum. After adjusting this relative angular relationship, the housings 5, 6 are fixed to each other, e.g. with the aid of glue.

The embodiment of the invention described hereinbefore can be modified in many ways and varied within the scope of the inventive concept. Instead of the eccentric fit 14a, 14b, which has, inter alia, the function of allowing radial displacement of the gear wheels 1 and 2 relative each other, a linear displacement of the gear wheels can be carried out with the aid of other means.

Glueing, or cementing has been proposed above as means for fixing the gear wheels to the shafts, for fixing the transducers in their respective housings and for fixing the housings relative each other, but it will be understood that other means, e.g. set screws, can be used. The number of teeth has been stated to be 63 and 64 respectively, but it will be understood that other values can be used, as well as having a difference in the respective number of teeth other than 1, e.g. 2, 3 or more.

The housing parts 5, 6 have been shown above as separate units, but it will be understood that a housing 5' can be integral with the housing of the transducer 10', and a housing 6' can be integral with the housing of the transducer 11' as depicted in FIG. 6.

In addition, several apparatuses in accordance with the invention can be connected in series for increasing the measuring range. For example, as depicted in FIG. 7, an extra angle transducer 11" can be provided. Angle transducer 11" includes a gear 2", similar to gear 2, affixed to a driven shaft 4" similar to driven shaft 4. In addition, angle transducer 11 includes a gear 1", similar to gear 1, affixed to a drive shaft 3" similar to drive shaft 3. The additional angle transducer 11" is coupled to angle transducer 11 through an eccentric means of the type already described herein including sleeves 5", 6" which are similar to sleeves 5, 6.

I claim:

1. Angle transducer unit of the multiturn type for absolute measurement of the angular position of a rotatable shaft, including a first angle transducer of the absolute angular measurement type, with a drive shaft, which is nonrotatably mounted on the rotatable shaft, said first angle transducer including a first housing, a second angle transducer of the absolute angular measurement type, with a driven shaft, said second angle transducer including a second housing, and gear wheels respectively mounted on the drive and driven shafts, said gear wheels being in mesh with each other to form a gear for up or down gearing of the drive shaft rotational rate, both angle transducers being intended for convention connection to an apparatus for measuring the differential angular position of the drive and driven shafts characterized in that said gear wheels are respectively an internally toothed gear wheel and an externally toothed gear wheel, the latter
   (a) rolling against the internally toothed gear wheel,
   (b) having a number of teeth which is only some few teeth less than the number of teeth on the internally toothed gear wheel, and
   (c) being mounted on one of said drive or driven shaft, the internally toothed gear wheel being mounted on the other of said drive or driven shaft, and in that eccentric means is provided in the form of a bore provided in said first housing and a corresponding cylindrical surface provided on said second housing, said first housing being attached to said second housing such that said cylindrical surface is fitted into said bore for permitting the assembly of the shafts eccentrically in relation to each other.

2. Angle transducer unit as claimed in claim 1, characterized in that the internally toothed gear wheel is mounted on the drive shaft and that the externally toothed gear wheel is mounted on the driven shaft, which then rotates at a rate which is somewhat higher than that for the drive shaft.

3. Angle transducer unit as claimed in claim 1, characterized in that the externally toothed gear wheel is mounted on the drive shaft and that the internally toothed gear wheel is mounted on the driven shaft, which then rotates at a rate which is somewhat less than for the drive shaft.

4. Angle transducer unit as claimed in claim 1, wherein said first housing is a first cylindrical sleeve one end of which includes said bore oriented eccentrically relative the longitudinal symmetry axis of said first sleeve, and wherein said second housing is a second cylindrical sleeve one end of which includes said corresponding cylindrical surface, said cylindrical surface being oriented eccentrically relative the longitudinal axis of said second sleeve to form a projecting neck intended to be a light drive fit in said bore, the centers of said bore and said cylindrical surface being mutually coinciding and eccentric to the longitudinal symmetry axis of said first sleeve by an amount (f) and also eccentric to the longitudinal symmetry axis of said second sleeve by the vectorial sum of e and f where e is the difference between the pitch radii of the gear wheels and f is a suitable value for reducing the backlash between the gear wheels by turning the first and second sleeves relative each other.

5. Angle transducer unit as claimed in claim 4, characterized in that said first sleeve is affixed to said first angle transducer and said second sleeve is affixed to said second angle transducer.

6. Angle transducer unit as claimed in claim 1 characterized in that said first housing is integral with said first angle transducer and said second housing is integral with said second angle transducer.

7. Angle transducer unit as claimed in claim 1, characterized in that said first and second housings are glued to each other.

8. Angle transducer unit as claimed in claim 1, characterized in that on the driven shaft there are mounted an extra gear, extra angle transducer and extra eccentric means for increasing the angle measurement range.

9. Angle transducer unit as claimed in claim 8, characterized by a sealing cover plate being fixedly arranged on the drive shaft and extending over the side face of the internally toothed gear wheel for sealing it.

10. Angle transducer unit as claimed in claim 2, wherein said first housing is a first cylindrical sleeve one end of which includes said bore oriented eccentrically relative the longitudinal symmetry axis of said first sleeve, and wherein said second housing is a second cylindrical sleeve one end of which includes said corresponding cylindrical surface, said cylindrical surface being oriented eccentrically relative the longitudinal axis of said second sleeve to form a projecting neck intended to be a light drive fit in said bore, the centers of said bore and said cylindrical surface being mutually coinciding and eccentric to the longitudinal symmetry axis of said first sleeve by an amount (f) and also eccentric to the longitudinal symmetry axis of said second sleeve by the vectorial sum of e and f where e is the difference between the pitch radii of the gear wheels and f is a suitable value for reducing the backlash between the gear wheels by turning the first and second sleeves relative each other.

11. Angle transducer unit as claimed in claim 3, wherein said first housing is a first cylindrical sleeve one end of which includes said bore oriented eccentrically relative the longitudinal symmetry axis of said first sleeve, and wherein said second housing is a second cylindrical sleeve one end of which includes said corresponding cylindrical surface, said cylindrical surface being oriented eccentrically relative the longitudinal axis of said second sleeve to form a projecting neck intended to be a light drive fit in said bore, the centers of said bore and said cylindrical surface being mutually coinciding and eccentric to the longitudinal symmetry axis of said first sleeve by an amount (f) and also eccentric to the longitudinal symmetry axis of said second sleeve by the vectorial sum of e and f where e is the difference between the pitch radii of the gear wheels and f is a suitable value for reducing the backlash between the gear wheels by turning the first and second sleeves relative each other.

12. Angle transducer unit as claimed in claim 4 characterized in that said first housing is integral with said first angle transducer ad said second housing is integral with said second angle transducer.

13. Angle transducer unit as claimed in claim 4, characterized in that said first and second housings are glued to each other.

14. Angle transducer unit as claimed in claim 3, characterized in that on the driven shaft there are mounted an extra gear, extra angle transducer and extra eccentric means for increasing the angle measurement range.

15. Angle transducer unit as claimed in claim 4, characterized in that on the driven shaft there are mounted an extra gear, extra angle transducer and extra eccentric means for increasing the angle measurement range.

16. Angle transducer unit as claimed in claim 5, characterized in that on the driven shaft there are mounted an extra gear, extra angle transducer and extra eccentric means for increasing the angle measurement range.

17. Angle transducer unit as claimed in claim 4, characterized by a sealing cover plate being fixedly arranged on the drive shaft and extending over the side face of the internally toothed gear wheel for sealing it.

18. Angle transducer unit as claimed in claim 14, characterized by a sealing cover plate being fixedly arranged on the drive shaft and extending over the side face of the internally toothed gear wheel for sealing it.

19. Angle transducer unit as claimed in claim 15, characterized by a sealing cover plate being fixedly arranged on the drive shaft and extending over the side face of the internally toothed gear wheel for sealing it.

20. Angle transducer unit as claimed in claim 16, characterized by a sealing cover plate being fixedly arranged on the drive shaft and extending over the side face of the internally toothed gear wheel for sealing it.

* * * * *